(12) United States Patent
Shuster

(10) Patent No.: US 8,431,263 B2
(45) Date of Patent: Apr. 30, 2013

(54) AUTOMATED COMPOSITE BATTERY

(76) Inventor: Gary Stephen Shuster, Fresno, CA (US)

(*) Notice: Subject to any disclaimer, the term of this patent is extended or adjusted under 35 U.S.C. 154(b) by 979 days.

(21) Appl. No.: 11/743,504

(22) Filed: May 2, 2007

(65) Prior Publication Data

US 2008/0274395 A1    Nov. 6, 2008

(51) Int. Cl.
*H01M 10/52* (2006.01)
*H01M 6/42* (2006.01)

(52) U.S. Cl.
USPC .............................................. 429/61; 429/150

(58) Field of Classification Search .................. None
See application file for complete search history.

(56) References Cited

U.S. PATENT DOCUMENTS

| | | | |
|---|---|---|---|
| 4,672,194 A | 6/1987 | Kastendieck et al. | |
| 5,241,923 A * | 9/1993 | Janning | 119/721 |
| 5,515,100 A * | 5/1996 | Nogo | 348/211.2 |
| 5,611,720 A | 3/1997 | Vandermaas | |
| 5,729,019 A * | 3/1998 | Krafthefer et al. | 250/353 |
| 5,963,012 A | 10/1999 | Garcia et al. | |
| 6,118,248 A | 9/2000 | Gartstein et al. | |
| 6,160,483 A | 12/2000 | Radwan | |
| 6,165,037 A | 12/2000 | Van Zant | |
| 6,252,378 B1 * | 6/2001 | Crass et al. | 320/132 |
| 6,431,937 B1 | 8/2002 | Lau et al. | |
| 6,828,755 B1 | 12/2004 | Iverson et al. | |
| 6,853,301 B2 * | 2/2005 | Devine | 340/571 |
| 7,010,332 B1 | 3/2006 | Irvin et al. | |
| 7,388,349 B2 * | 6/2008 | Elder et al. | 320/104 |
| 7,479,877 B2 * | 1/2009 | Mortenson et al. | 340/545.6 |
| 7,586,408 B1 * | 9/2009 | Mudge | 340/541 |
| 2002/0174720 A1 * | 11/2002 | Cardarelli | 73/504.02 |
| 2004/0131925 A1 * | 7/2004 | Jenson et al. | 429/61 |
| 2005/0041352 A1 * | 2/2005 | Seo | 361/92 |
| 2005/0093371 A1 | 5/2005 | Zdziech et al. | |
| 2005/0201569 A1 * | 9/2005 | Kuraoka et al. | 381/74 |
| 2005/0218902 A1 * | 10/2005 | Restaino et al. | 324/433 |
| 2005/0225289 A1 * | 10/2005 | Iida et al. | 320/116 |
| 2006/0015762 A1 * | 1/2006 | Chiu | 713/340 |
| 2006/0161377 A1 * | 7/2006 | Rakkola et al. | 702/141 |
| 2006/0261233 A1 * | 11/2006 | Williams et al. | 248/311.2 |
| 2007/0037610 A1 * | 2/2007 | Logan | 455/574 |
| 2007/0212596 A1 * | 9/2007 | Nebrigic et al. | 429/61 |
| 2008/0303661 A1 * | 12/2008 | Chick | 340/541 |
| 2008/0318518 A1 * | 12/2008 | Coutinho et al. | 455/3.06 |

FOREIGN PATENT DOCUMENTS

DE      42 18 548 A1    12/1992

* cited by examiner

*Primary Examiner* — Melvin C Mayes
*Assistant Examiner* — Sheng H Davis
(74) *Attorney, Agent, or Firm* — Novak Druce Connolly Bove + Quigg; Jonathan Jaech

(57) ABSTRACT

A composite battery capable of adjusting its own power output in response to predetermined signals or lack of predetermined signals is provided. The composite battery has a set of terminals, a battery, a sensing device and a switch, all housed within a casing, which can be in the shape of a conventional battery. The sensor captures signals which upon reaching a certain threshold cause the switch to engage or disengage to selectively provide a load current to an electronic device. The battery may be used in battery-controlled consumer electronics articles, such as toys, to prevent avoidable battery drain or unintended activation when the electronics article is not in use.

12 Claims, 4 Drawing Sheets

AUTOMATED COMPOSITE BATTERY

BACKGROUND OF THE INVENTION

1. Field of the Invention

The invention relates to a composite battery capable of adjusting its own power output in response to predetermined signals or lack of predetermined signals.

2. Background of the Invention

Many electronic devices require batteries for power such as radios, compact disc players, cameras, cellular phones, electronic games, toys, pagers and computers devices. Generally these electronic devices require a manually operated on/off switch. Manually powering an electronic device can be cumbersome, inconvenient and even forgotten. For instance, a common scenario arises with young children. After enjoying a battery powered toy they forget to manually turn it off. A charge is continually drawn from the battery until all of its stored power has dissipated. The exhausted primary battery is no longer useable and must be thrown-away. A further problem arises when a motion-sensitive toy that is not manually turned off is triggered by movement after a child is asleep, disturbing the child.

A need exists for a mechanism to turn on and off electronic devices without manual switching. At present, this functionality is achieved by configuring an electronic device with a timer. For example, U.S. Pat. No. 6,165,035 issued to Van Zant describes a toy containing a night-light. If the child falls asleep without turning off the light, a timer inside the toy automatically deactivates the light after a predetermined time period. Another battery powered device that does not require an off switch is described in U.S. Pat. No. 4,672,194 issued to Kastendieck et al. Kastendieck et al. describe a circuit for automatically removing battery power from night vision goggles. When the goggles are attached to a headgear, a circuit is completed to provide power to the goggles. Upon detachment from the headgear, the circuit is disrupted and prevents continued electrical draw from the battery. This mechanism eliminates the necessity of turning off the device after use and thereby preserves battery life. However, the goggle/headgear device must be specially configured to automatically "turn-off" upon disassembly.

Accordingly, it would be advantageous to provide a composite battery with a built-in power control system useable in any electronic device. The composite battery would eliminate the need for the electrical device to be specially configured with a power control means. It would also be advantageous to provide a composite battery in the shape of a conventional battery thereby further eliminating the need to alter existing electronic devices while providing them with an automated powering system.

SUMMARY OF THE INVENTION

The invention relates to a composite battery capable of adjusting its own power output in response to predetermined signals or lack of predetermined signals. The composite battery may comprise a set of terminals, a battery, a sensor and a switch, all housed within a casing, which may be in the shape of a conventional battery. The sensor captures signals that cause the switch to engage or disengage to selectively provide a load current to an electronic device. The invention may be particularly useful in battery-controlled electronics such as toys used by young children who frequently forget to turn off the toy after use, or who fall asleep without turning off a motion-sensitive toy.

According to an aspect of the present disclosure, there is provided a composite battery and sensor combination which is operatively disposed within a single housing for use in an electronic device having a:

terminal;

battery capable of supplying energy to the electronic device through the terminal;

a sensor disposed on or within the housing; and a switch interposed between the battery and terminal, capable of selectively providing a connection between the battery and the terminal means in response to information captured by the sensor. The composite battery may also have a timer. In one embodiment, the single housing is in the shape of a conventional battery thereby allowing any electronic device to become automated by incorporation of the composite battery. The sensor can be, for example, a MEMS device, a liquid-based switch sensor, a contact switch sensor, a proximity sensor, or a current load sensor.

The present disclosure also relates to a composite battery and sensor combination which is operatively disposed within a single housing for use in an electronic device having a:

terminal means;

battery means capable of supplying energy to the electronic device through the terminal means;

a sensor;

a processor; and a switch capable of selectively providing a connection between the battery and the terminal means in response to information captured by the sensor. The composite battery may also have a timer. In one embodiment the single housing is in the shape of a conventional battery thereby allowing any electronic device to become automated by incorporation of the composite battery. The sensor can be, for example, a MEMS device, a liquid-based switch sensor, a contact switch sensor, a proximity sensor, and a current load sensor. The processor can be, for example, a computing device, microprocessor, programmable logic controller ("PLC"), a microcomputer or programmable digital processor.

The present disclosure also relates to a method of providing power from a composite battery having a battery means and a switch comprising the steps of:

placing the composite battery in a non-power delivering state;

detecting a predetermined signal via a sensor disposed in the composite battery and associated with the switch;

transitioning the composite battery from a non-power delivering state to a power delivering state in response to a threshold level of a predetermined signal.

The method further includes continuing to monitor for a predetermined signal while the composite battery is in either a non-power delivering state or a power delivering state. The step of transitioning the composite battery from a non-power delivering state to a power delivering state may include starting a timer set at a predetermined time limit. Upon expiration of the timer, the composite battery can transition from a non-power delivering state to a power delivering state. In one embodiment, the composite battery resets the timer to preventing its expiration in response to detecting a predetermined signal during continuous monitoring.

Alternatively, the present disclosure relates to a method of restricting power delivered from a composite battery having a battery means and a switch comprising the steps of:

placing the composite battery in a power delivering state;

detecting a predetermined signal via a sensor disposed in the composite battery and associated with the switch;

transitioning the composite battery from a power delivering state to a non-power delivering state via the switch in response to a threshold level of a predetermined signal.

The method further includes continuing to monitor for a predetermined signal while the composite battery is in either a non-power delivering state or a power delivering state. The step of transitioning the composite battery from a power delivering state to a non-power delivering state may include starting a timer set at a predetermined time limit. Upon expiration of the timer, the composite battery can transition from a power delivering state to a non-power delivering state. In one embodiment, the composite battery resets the timer or keeps the timer in a hold position, thereby preventing its expiration, in response to detecting a predetermined signal during continuous monitoring.

A more complete understanding of the method and system for preventing the copying of an optically-readable disk will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION

The invention relates to a self-contained composite battery capable of controlling its own power output in response to predetermined signals or lack of predetermined signals from a sensor fixed to the battery itself. In the detailed description that follows, like element numerals are used to indicate like elements appearing in one or more of the figures.

Figure 1:
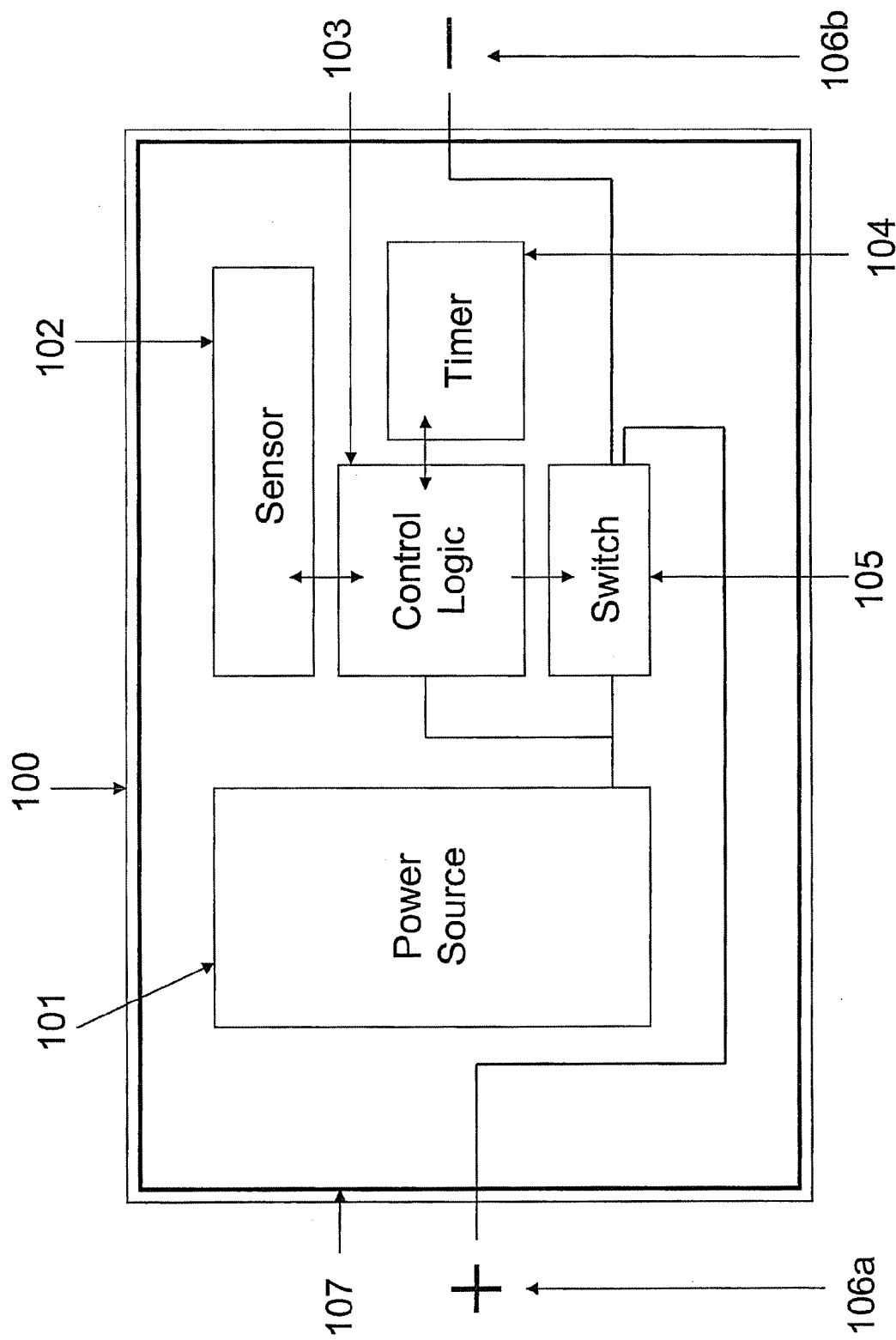
FIG. 1 is a simplified functional block diagram of the composite battery in one embodiment of the present disclosure.

FIG. 1 illustrates one embodiment of a composite battery 107 in a simplified functional block diagram. A power source 101 and a sensor 102 are operatively disposed within a container 100. A power control switch 105 selectively enables (activates or deactivates) the connection between the power source 101 and the terminals 106a & 106b. In one embodiment, the power control switch 105 may adjust to allow for more or less power to be supplied from the power source 101 to the terminals 106a and 106b.

The power source 101 may comprise a combination of anode and cathode materials as known in the art of chemical dry-cell batteries, for example, a zinc-oxide or manganese-oxide based battery. The interface between the power control switch 105 and the sensor 102 may include a processor 103, operatively engaged with the power control switch 105 to selectively adjust or turn completely on or off power supplied to terminals 106a, 106b. The processor 103 may comprise, for example, a computing device, microprocessor, controller or programmable logic controller ("PLC") for implementing a control program, and which provides output signals based on input signals provided by a sensor 102 or that are otherwise acquired or obtained. Any suitable computing device of any type may be included in the composite battery 107 according to an alternative embodiment. For example, computing devices of a type that may include a microprocessor, microcomputer or programmable digital processor, with associated software, operating system and/or any other associated programs to implement the control program may be employed.

The processor 103 and its associated program may be implemented in hardware, software or a combination thereof. In one embodiment, in response to a sensor output signal or lack of a sensor output signal, the processor 103 causes the power control switch 105 to turn off, thereby inactivating an electronic device powered by the composite battery 107. Alternatively, or in addition, in response to a sensor output signal or lack of a sensor output signal, the processor 103 causes the power control switch 105 to turn on, thereby activating an electronic device powered by the composite battery 107.

The composite battery 107 may also include a timer 104 that may be reset by the processor 103 based on the sensor output signal. The processor 103 starts the timer 104 upon activation by the sensor 102, the processor 103, or upon the switch 105 enabling power to selectively flow to the terminals 106a and 106b. For instance, subsequent or continued assertion of the sensor output signal by the sensor 102 causes the processor 103 to periodically reset the timer 104, thereby preventing its expiration. As an alternative to periodic resetting, continued assertion of the sensor output signal may cause the power control switch 105 to hold the timer 104 in reset. Absent such resetting, the timer 104 expires after a defined interval of time. Upon expiration of the timer 104, the power control switch 104 disables or enables the connection between the power source 101 and the terminals 106a and 106b. The various elements comprising the composite battery may be variously arranged in any operable manner.

Figure 2:
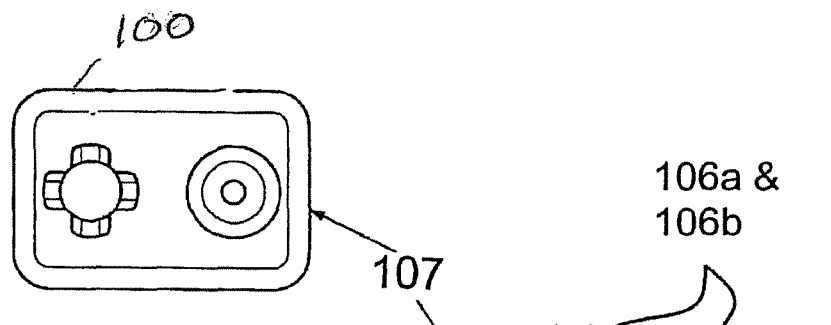
FIG. 2 is a top view of the external housing of the composite battery according to an embodiment of the present disclosure.
Figure 3:
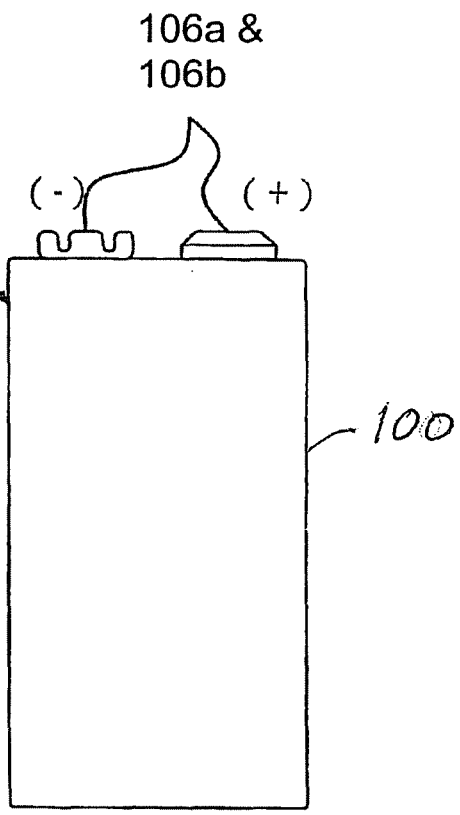
FIG. 3 is a side view of the external housing of the composite battery according to an embodiment of the present disclosure.

FIG. 2 shows a top view of an external container 100 of a composite battery 107 according to an embodiment of the present disclosure. FIG. 3 shows a side view of an external container 100 of a composite battery 107 according to an embodiment of the present disclosure. The schematics of FIG. 2 and FIG. 3 resemble the shape of a typical 9V battery such as Eveready 216, 522 or 1222, or Duracell MN1604. Batteries of this type are sometimes called "PP3" batteries and may have the following average dimensions:
Breadth: 25.5 mm
Height: 44.5 mm
Width: 16.5 mm.

This is just one example of the shape and size of a composite battery container 100. According to this disclosure, the container 100 can take any shape or size. The container 100 may be formed from steel or other suitable material. The container 100 contains the anode and cathode materials that store the electrical energy of the battery, and may contain other components described herein. In general, the container 100 comprises a structural material and may be configured to provide structural integrity for the composite battery. It may be configured in any suitable form, for example, PP3, AA, AAA, AAAA, C, D, and other standard or non-standard forms. Other non-limiting examples of battery shapes and sizes by which the housing may conform are provided in Table 1.

Figure 4:
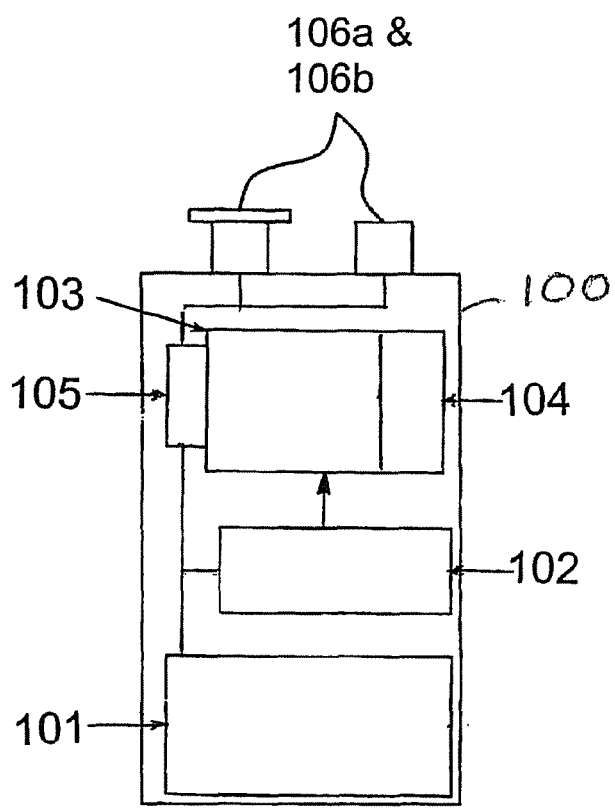
FIG. 4 is a schematic diagram of the composite battery according to an embodiment of the present disclosure.

FIG. 4 is a schematic diagram of the composite PP3 battery according to an embodiment of the present disclosure. A power source 101 and a sensor 102 may be mounted on an exterior surface of container 100. Most chemical batteries include an electrolyte solution that precludes operation of electronic devices. Therefore, the control elements 102, 103, 104, 105 may be placed outside the container 100, such as, for example, on a flexible substrate affixed to an exterior of the container. If placed inside container 100, the control elements may need to be sealed from contact with the container 100.

A power control switch 105 selectively enables (activates or deactivates) the connection between the power source 101 and the terminals 106a & 106b. In one embodiment, the power control switch 105 may adjust to allow for more or less power to be supplied from the power source 101 to the terminals 106a and 106b. Conventionally, the power source 101 is a battery comprising an electrochemical anode and cathode and an electrolyte.

The interface between the power control switch 105 and the sensor 102 may include processor 103, which causes the power control switch 105 to selectively adjust or turn completely on or off. The processor 103 may be a computing device, microprocessor, controller or programmable logic controller ("PLC") for implementing a control program, which provides output signals based on input signals provided by a sensor 102 or that are otherwise acquired or obtained. Any suitable computing device of any type may be included in the composite battery 107. For example, computing devices of a type that may include a microprocessor, microcomputer or programmable digital processor, with associated software, operating system and/or any other associated programs to implement the control program may be employed. The processor 103 and its associated program may be implemented in hardware, software or a combination thereof, or in a central program implemented in any of a variety of forms according to alternative embodiments.

In one embodiment, in response to a sensor output signal or lack of a sensor output signal, the processor 103 causes power control switch 105 to turn off, thereby inactivating an electronic device powered by the composite battery 107. Alternatively, in response to a sensor output signal or lack of a sensor output signal, the processor 103 causes power control switch 105 to turn on, thereby activating an electronic device powered by the composite battery 107. The composite battery 107 may also include a timer 104 that may be reset by the processor 103 based on the sensor output signal. The processor 103 starts the timer 104 upon activation by the sensor 102, the processor 103, or upon the switch 105 enabling power to flow to the terminals 106a and 106b. For instance, subsequent or continued assertion of the sensor output signal by the sensor 102 causes the processor 103 to periodically reset the timer 104, thereby preventing its expiration. As an alternative to periodic resetting, continued assertion of the sensor output signal may cause the power control switch 105 to hold the timer 104 in reset. Absent such resetting, the timer 104 expires after a defined interval of time. Upon expiration of the timer 104, the power control switch 104 disables or enables the connection between the power source 101 and the terminals 106a and 106b. The specific arrangement of the various elements comprising the composite battery is not critical to practicing the present disclosure.

Figure 5D:
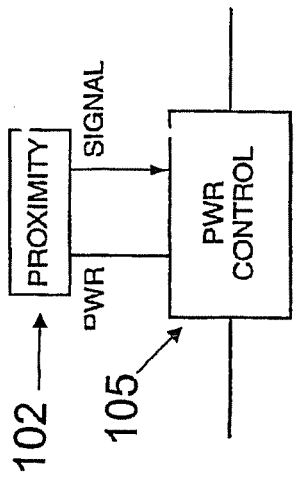
FIG. 5D is a simplified block diagram of the processor with an IR sensor.
Figure 5E:
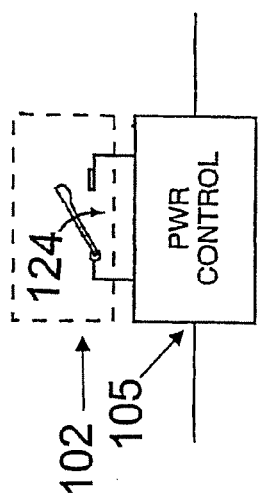
FIG. 5E is a simplified block diagram of the processor with a mechanical position switch.
Figure 5C:
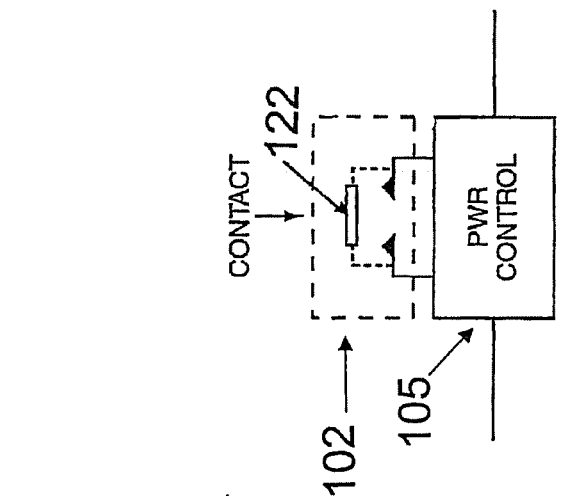
FIG. 5C is a simplified block diagram of the processor with a contact switch.
Figure 5A:
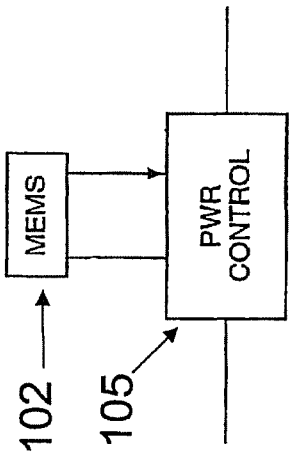
FIG. 5A is a simplified block diagram of the processor with a MEMS sensor.

In FIG. 5A, the power control switch 105 is operatively associated with a Micro-Electro-Mechanical-Systems ("MEMS") accelerometer device, with the MEMS device functioning as the sensor 102. Devices based on MEMS technology may be responsive to general vibration or motion, or may be configured to respond only to specific acceleration along defined axes. As MEMS devices may easily include output conditioning electronics, the sensitivity or responsiveness of the sensor 102 incorporating the MEMS device may be tailored such that the sensor output signal is asserted only for motion or vibration above a certain threshold. Typical MEMS employs modified microelectronics fabrication techniques and includes small mechanical elements responsive to movement or vibration, such as cantilever beams formed by selectively etching a silicon wafer. In a preferred embodiment of the present disclosure, sensor 102 includes a MEMS device simultaneously fulfilling the requirements of low power consumption, relative low-cost, and adequate signal discrimination. In this context, signal discrimination means that the sensor 102 is not prone to nuisance assertions of its sensor output signal caused by minute movement or vibration. The absence of signals from MEMS sensor 102 indicating lack of motion over a defined threshold within a defined time frame may be taken as an indication that the battery is no longer in use, causing power control unit 105 to switch off power supplied to the battery terminals.

Figure 5B:
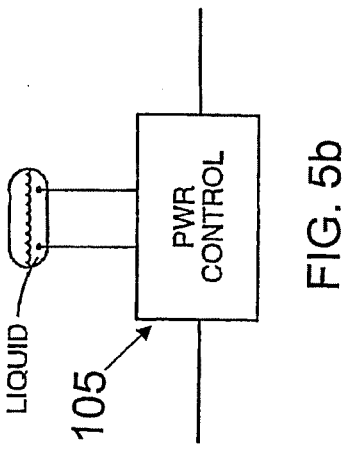
FIG. 5B is a simplified block diagram of the processor with a liquid-based switch.

FIG. 5B illustrates the power control switch 105 coupled to a motion-sensitive switch functioning as the sensor 102. The sensor 102 may comprise a conductive liquid-filled switch, or may employ other conductive moveable masses, such as balls or reeds. Depending upon its configuration, the sensor 102, implemented as a liquid-filled or moveable mass based switch, may function as a motion sensor or as an attitude sensor. As a motion sensor, the sensor 102 includes first and second contacts disposed in a manner such that motion of the contained liquid or other moveable conductive mass places the first and second contacts in electrical connection. As an attitude sensor, sensor 102 includes first and second contacts disposed in a manner such that one or more specific physical orientations of the composite battery 107 causes the contained liquid or other conductive mass in sensor 102 to place the first and second contacts in electrical connection. The power control switch 105 connects to the first and second contacts of sensor 102, and is responsive to the electrical connection completed by the contained liquid. When handled by itself or as part of a toy or other electronic article, sensor 102 may undergo repeated on/off cycles, which may be interpreted by a controller as indicating that the battery is in motion. Likewise, the absence of an on/off transition within a defined time frame may be taken as an indication that the battery is no longer in use, causing power control unit 105 to switch off power supplied to the battery terminals.

FIG. 5C illustrates the power control switch 105 coupled with a contact switch functioning as the sensor 102. The contact switch includes a first and second contact connected to the power control switch 105, and connecting member 122 actuated when pressure is applied to the composite battery or within the composite battery. When actuated, the connecting member 122 places the first and second contacts of sensor 102 in electrical connection. In one embodiment, the pressure for actuating the connecting member may provided by a temperature dependent expandable substance inside the composite battery 107. In this embodiment, sensor 102 operates as a temperature sensor that disables the battery if a temperature threshold is crossed. The battery may be disabled when too hot, when too cold, or may only be operable with a defined temperature range, depending on the desired application. For further example, a thermal sensor may be configured to sense human body temperature, and couple with a processor that closes the switch 105 to power the battery terminals only if the temperature is high enough, such as when the battery or nearby part of the apparatus it is powering is gripped by a human hand.

FIG. 5D illustrates the power control switch 105 coupled with a proximity sensor 102 not based on mechanical actuation. The proximity sensor 102 may be an active or passive IR sensor (pyroelectric sensor), may be a resistive or other type of thermal sensor, or may be an acoustic sensor or microphone. For example, a passive infrared sensor may be used as a proximity sensor, to provide an indication that a user is in close proximity to the composite battery. In the absence of an indication of a present and active user within a defined time period, the battery may be disabled. Likewise, if an acoustic sensor fails to pick up sound above a defined threshold, the battery may be deactivated.

FIG. 5E illustrates the power control switch 105 coupled to an alternate type of attitude sensor 102. In this embodiment, the attitude sensor 102 is a mechanical sensor that includes a contacting member 124 responsive to a physical orientation of the sensor 102. In one or more physical orientations, the contacting member 124 does not electrically connect the first and second contacts of attitude sensor 102. In one or more other physical orientations, the contacting member places the first and second contacts of attitude sensor 102 in electrical connection. The power control switch 105 is configured to be responsive to this electrical connection. Contacting member 124 may be resiliently biased away from one or both contacts to ensure an open electrical connection between contacts when the composite battery is not oriented in a position indicative of use. A battery configured with a sensor as shown in FIG. 5E may be used to disable a toy or other device that is not kept upright.

Any of the foregoing or other presence sensing techniques may be used to implement sensor 102. In general, sensor 102 and all other electronic components of the battery, generally referred to as the "battery control circuitry," should be configured to require negligible power while operating, preferably as little power as possible. For a non-rechargeable battery, the battery control circuitry may be designed to consume less than a certain percentage of the designed capacity over the battery shelf life. For example, if a non-rechargeable battery has a design capacity of 3000 mA-hours and a nominal shelf life of three years (excluding drain from the battery control circuitry), the battery control circuitry may be designed to consume less than 20% of this over the lifetime of the battery, or slightly more than 0.1 mA on a continuous basis. The energy "cost" of the battery control circuitry is made up for by preventing the battery from being inappropriately discharged, thereby extending its working life. Of course, the larger the capacity of the battery, the easier it may be to provide battery control circuitry having an acceptable physical form factor and power requirements.

For rechargeable batteries, similar but less stringent considerations may apply. For example, the battery control circuitry may consume as much as 5-10% of the design power drain on the battery, without noticeably decreasing the available working time between recharging. To the extent that the cost of providing the battery control circuitry is not relatively small compared to the cost of the battery itself, it may be preferable to ensure that the power source 101 is rechargeable.

Various systems may be developed to reduce power required by a battery control circuit. For example, in embodiments of the invention, the battery control circuitry may be powered by a separate power source within container 100. For further example, in other embodiments of the invention, the battery control circuitry may comprise components, such as a solid-state main switch, that do not draw power except when the battery is in use. When the battery is not in use, only low-power components, such as sensor and a lower-power 'boot" module are operative. When the sensor is stimulated, such as by movement of the battery, the boot module may "wake up" a control module, which in turn opens the main switch to power the battery terminals. Yet another alternative may be to use mechanical energy from movement of the battery to provide enough power to "wake up" the battery control circuitry, using, for example, a micro-scale dynamo.

Accordingly, in another embodiment, the composite battery includes an optional sleep state. In the sleep state, only a portion of the composite battery's circuitry is enabled. Rather than transitioning from a power delivering state to non-power delivering state, the composite battery transitions to a sleep state. In a sleep state, the composite battery periodically monitors for a signal. Upon detection of such a predetermined signal, the composite battery transitions to its power delivering state, thereby providing power to an electronic device.

In another embodiment, the switch may be a magnetic proximity sensor switch or may be a mechanical switch or relays that respond to a current or voltage change in connect and disconnect from the battery power source. The power switches may include multiple switches to disconnect certain loads. According to another alternative embodiment, the switches may be solid state switches comprising primarily semi-conducting materials and components, such as metal oxide semiconductor field effect transistor ("MOSFET").

In another embodiment, the instant disclosure includes, but is not limited to, composite batteries having the capacity, voltage and shape of batteries commercially sold and commonly used in electronic devices. Table 1 below provides a non-exhaustive list of commercial batteries currently used in many electronic devices.

TABLE 1

| Names | IEC Name | ANSI/NEDA Name | Typical Capacity (mAh) | Nominal Voltage | Shape | Size |
| --- | --- | --- | --- | --- | --- | --- |
| Camera Battery CR123 | CR17354 (Lithium) | 5018LC (Lithium) | 1500 (Lithium) 700 (Li-Ion) | 3 | Cylinder | L 34.5 mm D 17 mm |
| Bardic Lamp Battery | 3LR12 (alkaline) 3R12 (carbon-zinc) | MN1203 (Mn) | 2500 (alkaline) 1200 (carbon-zinc) | 4.5 | Flat Pack | H 70 mm L 60 mm W 22 mm |
| PP3 9-Volt Radio | 6LR61 (alkaline) 6F22 (carbon-zinc) | 1604A (alkaline) 1604D (carbon-zinc) | 565 (alkaline) 400 (carbon-zinc) 1200 (lithium) | 9 7.2 (NiCd) 7.2 (NiMH) | Square | H 48.5 mm L 26.5 mm w 17.5 mm |

TABLE 1-continued

| Names | IEC Name | ANSI/NEDA Name | Typical Capacity (mAh) | Nominal Voltage | Shape | Size |
|---|---|---|---|---|---|---|
| Battery | 6KR | 1604LC (Lithium polymer recharge) | 120 (NiCd) 175 (NiMH) 500 (Lithium Polymer Rechargeable) | 8.4 (some NiCd and NimH) | | |
| AA LR6 (alkaline) R6 (carbon-zinc) | LR6 (alkaline) R6 (carbon-zinc) FR6 (Lithium-FeS$_2$) KR157/51 (NiCd) 1.2H2 (NiMH) | 15A (alkaline) 15D (carbon-zinc) 15LF (Lithium-FeS$_2$) 10015 (NiCd) | 2700 (alkaline) 1100 (carbon-zinc) 3000 (Lithium-FeS$_2$) 600–1000 (NiCd) 1700–2900 (NiMH) | .5 1.2 (NiCd) 1.2 (NiMH) | Cylinder | L 50.5 mm (not including terminal button) 13.5 ≦ D ≧ 14.5 mm |
| AAA | LR3 (alkaline) R3 (carbon-zinc) | 24A (alkaline) 24D (carbon-zinc) | 1200 (alkaline) 540 (carbon-zinc) 800–1000 (NiMH) | 1.5 1.2 (NiCd) 1.2 (NiMH) | Cylinder | L 44.5 mm D 10.5 mm |
| AAAA | LR8D425(alkaline) | 25A (alkaline) | 625 (alkaline) | 1.5 | Cylinder | L 42.5 mm D 8.3 mm |
| C | LR14 (alkaline) R14 (carbon-zinc) | 14A (alkaline) 14D (carbon-zinc) | 8000 (alkaline) 3800 (carbon-zinc) | 1.5 | Cylinder | L 50 mm D 26.2 mm |
| D | LR20 (alkaline) R20 (carbon-zinc) | 13A (alkaline) 13D (carbon-zinc) | 19500 (alkaline) 8000 (carbon-zinc) | 1.5 | Cylinder | L 61.5 mm D 34.2 mm |
| J | 4LR61 (alkaline) | 1412A(alkaline) | 625 (alkaline) | 6 | Square with missing corner | H 48.5 mm L 35.6 mm W 9.2 mm |
| N | LR1 (alkaline) | 910A(alkaline) | 1000 (alkaline) | 1.5 | Cylinder | H 48.5 mm L 35.6 mm W 9.2 mm |
| CR927 | | | 30 (Lithium) | 3 | Coin | D 9.5 mm H 2.7 mm |
| CR1620 | CR1620 (Lithium) | | | 3 | Coin | D 16 mm H 2.0 mm |
| CR1225 | CR1225 (Lithium) | | 50 | 3 | Coin | D 12.5 mm H 2.5 mm |
| CR2016 | CR2016 (Lithium) | 5000LC (Lithium) | 90 (Lithium) | 3 | Coin | D 20 mm H 1.6 mm |
| CR2025 | CR2025 (Lithium) | (Lithium) | 160 (Lithium) | 3 | Coin | D 20 mm H 2.5 mm |
| CR2032 | CR2032 (Lithium) | 5004LC (Lithium) | 225 (Lithium) | 3 | Coin | D 20 mm H 3.2 mm |
| CR2450 | CR2450 (Lithium) | 5029LC (Lithium) | 610 (Lithium) | 3 | Coin | D 24.5 mm H 5.0 mm |
| SR41 | LR41 (alkaline) SR41 (silver-oxide) | 1135SO (silver-oxide) 1134SO (silver-oxide) | 32 (alkaline) 42 (silver-oxide) | 1.50 (alkaline) 1.55 (silver-oxide) | Button | D 7.9 mm H 3.6 mm |
| SR43 | LR43 (alkaline) SR43 (silver-oxide) | 1133SO (silver-oxide) 1132SO (silver-oxide) | 80 (alkaline) 120 (silver-oxide) | 1.50 (alkaline) 1.55 (silver-oxide) | Button | D 11.6 mm H 4.2 mm |
| SR44 | LR44 (alkaline) SR44 (silver-oxide) | 1166A (alkaline) 1107SO (silver-oxide) 1131SOP (silver-oxide) | 150 (alkaline) 200 (silver-oxide) | 1.50 (alkaline) 1.55 (silver-oxide) | Button | D 11.6 mm H 5.4 mm |
| SR48 | SR48 (silver-oxide) | 1136SO (silver-oxide) 1137SO (silver-oxide) | 70 (silver-oxide) | 1.55 (silver-oxide) | Button | D 7.9 mm H 5.4 mm |
| SR54 | LR54 (alkaline) SR54 (silver-oxide) | 1138SO (silver-oxide) | 100 (alkaline) 85 (silver-oxide) | 1.50 (alkaline) 1.55 (silver-oxide) | Button | D 11.6 mm H 3.1 mm |
| SR60 | SR60 (silver-oxide) | 1175SO (silver-oxide) | 20 (silver-oxide) | 1.55 (silver-oxide) | Button | D 6.8 mm H 2.15 mm |

Figure 6:
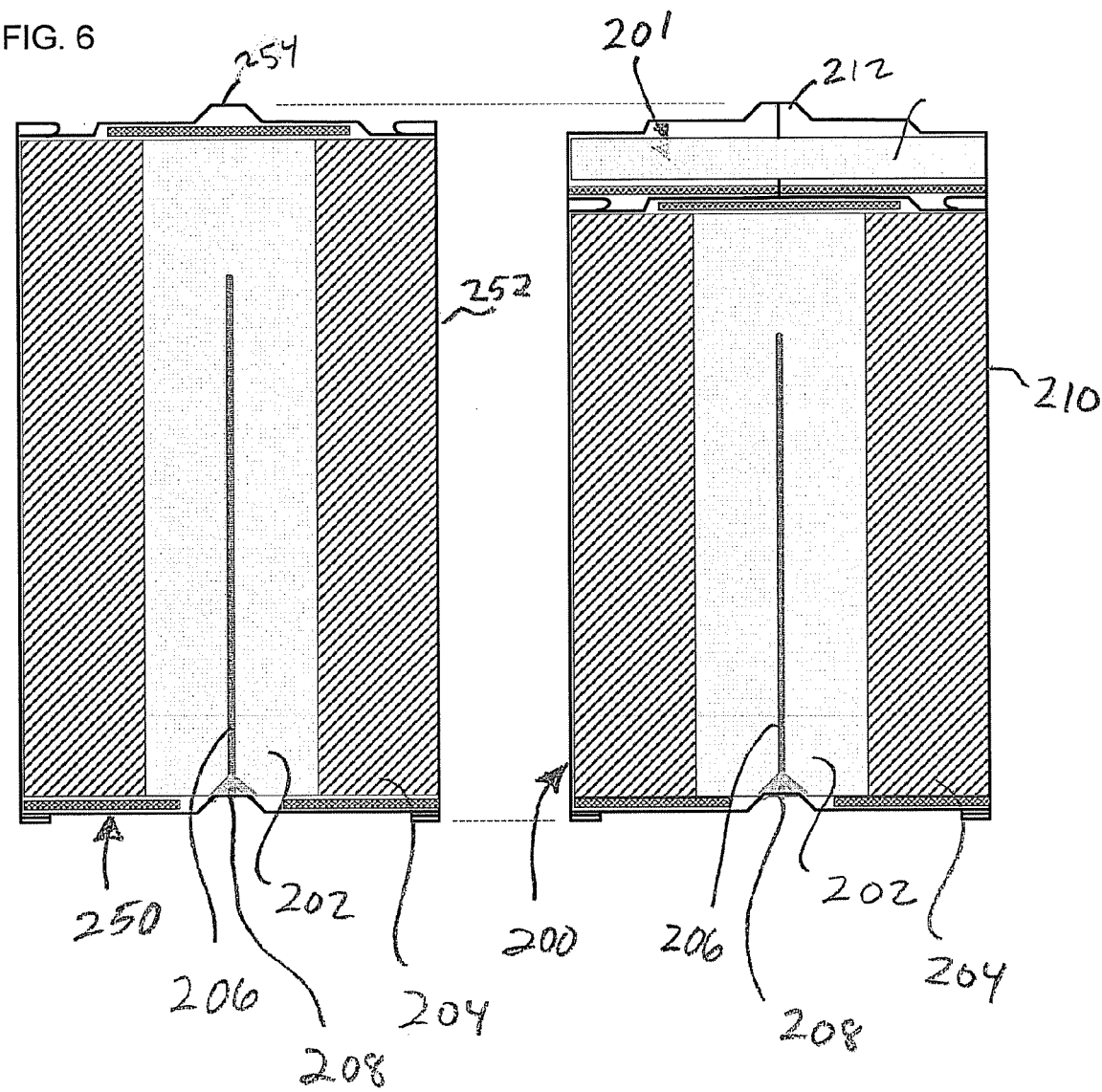
FIG. 6 is a schematic diagram showing an example of a battery equipped with control circuitry as described herein, compared to a battery lacking the control circuitry.

It is desirable that a battery with control circuitry according to the invention have the same form factor as a standard battery lacking control circuitry. This may enable a controlled-power battery as described herein to be used to power a wide variety of electronic apparatus designed to be powered by standard batteries, while providing these diverse apparatus with the safety or battery-conserving benefits that the control circuitry provides. FIG. 6 provides an exemplary comparison of a battery 200 equipped with control circuitry 201 as described herein with a prior-art battery 250. Both batteries 200 and 250 may have the same exterior dimensions and terminal configurations. Both may comprise an anode 202 and a cathode 204. Both may include a current collector 206 connected to an anode terminal 208. The anode and cathode of both may be contained with a steel container 252, 210.

The container 252 of battery 250 is, however, longer than the container 210 of battery 200. The cathode terminal 254 of battery 250 may be electrically connected to the steel container 252, which may act as a current collector for the cathode. In comparison, the cathode terminal 212 of battery 250 may be connected to the cathode only via the battery control circuit 201. The battery control circuit may be configured any suitable way as described herein to control current supplied to terminal 212 in response to sensor input. The battery control circuit and components thereof may be fixed relative to container 210 by mounting to a substrate 212, such as a circuit board substrate, that is in turn fixed to the container 210. The control circuitry 201 may be configured to supply power to cathode terminal 212 only when sensor data satisfies conditions programmed in advance for the controller. Circuit 201 may also be configured to permit recharging of the battery 210 when a voltage of reverse polarity is applied to the battery. Various other methods of mounting a control circuit within the form factor of a standard battery should be apparent, based on the foregoing description.

According to the foregoing, a method of controlling power delivered from a composite battery including a battery means and a switch may comprise the steps of:

placing the composite battery in a power delivering state;

detecting a predetermined signal or lack of a predetermined signal via a sensor disposed in the composite battery and associated with the switch;

transitioning the composite battery from the power delivering state to a non-power delivering state via the switch in response to the predetermined signal or the lack of a predetermined signal.

This method of claim may further comprise continuing to monitor, via the sensor, for the predetermined signal or the lack of a predetermined signal while the composite battery is in the power delivering state. In addition, the step of transitioning the composite battery from the power delivering state to the non-power delivering state may include starting a timer set at a predetermined time limit. The composite battery may transition from the power delivering state to the non-power delivering state upon expiration of the timer. Further, the composite battery may reset the timer, thereby preventing its expiration, in response to detecting the predetermined signal or the lack of a predetermined signal during the continued monitoring.

It is important to note that the construction and arrangement of the composite battery as shown in the exemplary embodiments is illustrative only. Although only a few embodiments of the present disclosure have been described in detail in this disclosure, those skilled in the art will readily appreciate that many modifications are possible (e.g. variations in sizes, dimensions, structures, shapes and proportions of the various elements, values of parameters, mounting arrangements, use of materials, colors, orientation, etc.) without materially departing from the novel teachings and advantages of the subject matter recited in the claims. For example, the composite battery is compatible and scalable with loads of any voltages according to alternative embodiments. The composite battery may include a number of compartments that may be configured in various orientations (e.g. horizontal, vertical, etc.) and positions and configured (e.g. shaped and sized) into the shape of any number of different battery shapes. Accordingly, all such modifications are intended to be included within the scope of the present disclosure as defined in the appended claims. The order or sequence of any process or method steps may be varied or re-sequenced according to alternative embodiments. In the claims, any means-plus-function clause is intended to cover the structures described in this disclosure as performing the recited function and not only structural equivalents but also equivalent functions. Other substitution, modification, changes and omissions may be made in the design, operating conditions and arrangement of the embodiments without departing from the spirit of the present disclosure as expressed in the appended claims.

What is claimed is:

1. A self-contained composite battery for use in an electronic device comprising:

a battery comprising an anode and a cathode;

a container holding the anode and cathode;

a pair of electrical terminals fixed on an outer surface of the container, each of the pair electrically connected to a respective one of the anode and the cathode, the container and the pair of electrical terminals configured as a removable composite battery having the pair of electrical terminals configured as a terminal interface thereof;

a sensor affixed to one of an inside and an exterior of the container, wherein the sensor comprises a temperature sensor; and a switch fixed relative to the container and electrically interposed between one of the anode or cathode and a respective one of the pair of electrical terminals, the switch capable of selectively providing a connection between the one of the anode and the cathode and the one of the electrical terminals in response to a signal indicative of a stimulus sensed by the sensor such that the composite battery is configured to control power output from the pair of electrical terminals; and a processor fixed relative to the container and connected to the switch and to the sensor, the processor configured to control the switch in response to input from the sensor, wherein the processor is configured to open the switch, thereby cutting connection between the one of the anode and the cathode and the one of the pair of electrical terminals, in response to sensor input indicative of a sensor temperature less than a defined threshold.

2. The composite battery of claim 1, further comprising a timer fixed relative to the container and connected to the switch and to the sensor, the timer capable of measuring an elapsed time from a time of receiving a signal from the sensor, and wherein the switch is further capable of selectively providing a connection between the one of the anode and the cathode and the one of the pair of electrical terminals in response to a signal indicative of elapsed time measured by the timer.

3. The composite battery of claim 1, wherein the container and battery are configured to conform to a battery type selected from a PP3, AA, AAA, AAAA, C, or D battery type.

4. The composite battery of claim 1, wherein the sensor is selected from the group consisting of a MEMS device, a motion sensor, a liquid-based switch sensor, a contact switch sensor, a proximity sensor, and a current load sensor.

5. The composite battery of claim 2, wherein the sensor is selected from the group consisting of a MEMS device, a liquid-based switch sensor, a contact switch sensor, a proximity sensor, and a current load sensor.

6. The composite battery of claim 1, wherein the processor is selected from the group consisting of a microprocessor, programmable logic controller ("PLC"), a microcomputer, programmable digital processor and combinations thereof.

7. The composite battery of claim 1, wherein the sensor comprises an accelerometer and the processor is configured to open the switch, thereby cutting connection between the battery and the terminal, in response to sensor input indicative of an absence of battery movement for a defined time period.

8. The composite battery of claim 1, wherein the sensor comprises a pyroelectric detector, and the processor is configured to open the switch, thereby cutting connection between the battery and the terminal, in response to sensor input indicative of an absence of human movement within range of the detector for a defined time period.

9. The composite battery of claim 1, wherein the sensor comprises a microphone and the processor is configured to open the switch, thereby cutting connection between the one of the anode and the cathode and the one of the pair of electrical terminals, in response to sensor input indicative of ambient noise less than a defined threshold for a defined time period.

10. The composite battery of claim 1, wherein the sensor comprises a visible light sensor and the processor is configured to open the switch, thereby cutting connection between the one of the anode and the cathode and the one of the pair of electrical terminals, in response to sensor input indicative of ambient light less than a defined threshold for a defined time period.

11. The composite battery of claim 1, further comprising a substrate contained inside the container interposed between one of the anode or cathode and a respective one of the pair of electrical terminals, the substrate holding at least one of the switch, sensor, and processor.

12. The composite battery of claim 1, wherein the switch comprises a solid-state device.

* * * * *